United States Patent [19]

Dao-Trong et al.

[11] Patent Number: 5,070,471
[45] Date of Patent: Dec. 3, 1991

[54] HIGH SPEED MULTIPLIER WHICH DIVIDES MULTIPLYING FACTOR INTO PARTS AND ADDS PARTIAL END PRODUCTS

[75] Inventors: Son Dao-Trong, Stuttgart; Klaus J. Getzlaff, Schoenaich; Klaus Helwig, Sindelfingen, all of Fed. Rep. of Germany

[73] Assignee: International Business Machines Corp., Armonk, N.Y.

[21] Appl. No.: 478,283

[22] Filed: Feb. 9, 1990

[30] Foreign Application Priority Data

Feb. 21, 1989 [EP] European Pat. Off. ........ 89102956.3

[51] Int. Cl.⁵ ............................................. G06F 7/52
[52] U.S. Cl. ................................................. 364/760
[58] Field of Search ........................................ 364/760

[56] References Cited

U.S. PATENT DOCUMENTS

| | | | |
|---|---|---|---|
| 4,484,301 | 11/1984 | Borgerding et al. | 364/760 |
| 4,525,796 | 6/1985 | Omoda et al. | 364/760 |
| 4,799,183 | 1/1989 | Nakano et al. | 364/760 |
| 4,817,029 | 3/1989 | Finegold | 364/760 |
| 4,831,577 | 5/1989 | Wei et al. | 364/760 |

FOREIGN PATENT DOCUMENTS

0291440 10/1988 European Pat. Off. .
2189630A 10/1987 United Kingdom .

Primary Examiner—David H. Malzahn
Attorney, Agent, or Firm—Arthur J. Samodovitz

[57] ABSTRACT

A multiplier for multiplying two binary operands is presented which comprises an encoding unit, a multiplying unit composed of two multiplying arrays, and a logic unit. The encoding unit to which the second operand is applied generates factors following the Booth algorithm. The two multiplying arrays are respectively applied with the first operand as well as with factors belonging to the higher significance digits or the lower significance digits, respectively, of the second operand. In both multiplying arrays the multiplication of the factors with the first operand into a respective partial end product is simultaneously performed. Both partial end products are applied to the logic unit which generates therefrom the end product in accordance with the algorithm used at the beginning.

17 Claims, 8 Drawing Sheets

FIG. 1

| C0-C28 / C29-C57: | | | FACTORS |
| --- | --- | --- | --- |
| $C_{i-1}$ | $C_i$ | $C_{i+1}$ | |
| 0 | 0 | 0 | * 0 |
| 0 | 0 | 1 | * 1 |
| 0 | 1 | 0 | * 1 |
| 0 | 1 | 1 | * 2 |
| 1 | 0 | 0 | *(-2) |
| 1 | 0 | 1 | *(-1) |
| 1 | 1 | 0 | *(-1) |
| 1 | 1 | 1 | * 0 |

| FAKTOREN | 1X | 2X | TX | T1X | OUT |
|---|---|---|---|---|---|
| *0 | 0 | 0 | — | — | 0 |
| *1 | 1 | 0 | 0 | — | Di |
| *2 | 0 | 1 | — | 0 | Di+1 |
| *(−1) | 1 | 0 | 1 | — | DiF |
| *(−2) | 0 | 1 | — | 1 | Di+1F |

HIGH SPEED MULTIPLIER WHICH DIVIDES MULTIPLYING FACTOR INTO PARTS AND ADDS PARTIAL END PRODUCTS

The invention relates to a multiplier.

Heretofore, a multiplier was known from EP 129 039 B1. In the multiplier disclosed there, an encoding unit operating in accordance with the Booth algorithm is applied with an operand Y and subsequently forms a sequence of figure pairs thereof. These figure pairs are applied to a following multiplying-adding unit which is furthermore supplied with a second operand X. In this multiplying-adding unit, operand Y is multiplied with the figure pairs formed by the encoding unit, with partial products being formed. These partial products are subsequently added up to form a final product.

As specified in the embodiments cited in the patent, the multiplier decribed is particularly suitable for operands with a smaller number of digits, e.g. for ten-digit operands. For operands with a high number of digits, however, e.g. for sixty-digit operands the multiplier described has the disadvantage that particularly the successive addition of partial products causes very high processing times.

It is the object of the invention to provide a multiplier which also in connection with a higher number of operand digits requires a minimum processing time for the multiplication thereof.

SUMMARY OF THE INVENTION

With a multiplier of the above specified type, this object is achieved by dividing the multiplying unit into two multiplying arrays, and by correspondingly applying the factors formed of the second operand to the two multiplying arrays. The first operand is multiplied with the respective factors at the same time in the two multiplying arrays, and subsequently the partial products obtained are added. As a consequence, one respective partial end product is available at the outputs of the two multiplying arrays at approximately the same time. The partial end products are logically combined into an end product in the logic unit provided subsequent thereto. Through this time-parallel processing of the two operands, the number of successive additions of partial products is reduced, which in turn causes a considerable reduction of the time delay caused by multiplication.

In an embodiment of the multiplier, the logic unit comprises several adding arrays, by means of which the logic digit combination of the two partial end products formed by the multiplying arrays is implemented.

The carry adder array provided in a further embodiment of the multiplier serves for generating the final product from the sums and carries partly generated by the adding arrays.

A further embodiment of the multiplier provides a carry modifying unit which depending on the algorithm used in the encoding unit is supplied with predetermined signals. With the Booth algorithm being applied, the carry modifying unit is supplied with the sign of the less significant partial end product as well as with the carry of that particular adder of the second and third adding array which is associated to the most significant digit of the less significant partial end product.

The algorithm used initially in the encoding unit is thus considered in the logic combination of the two partial end products.

In a still further embodiment of the multiplier the encoding unit generates by using the Booth algorithm and in the manner specified below, from the figures of the second operand predetermined output signals according to which the multiplying unit selects the figures of the first operand in the manner specified below. By fixing the output signals as described, and by logically combining them with the figures of the first and second operand in the manner specified above it is made sure that in an integrated structure of the multiplier the space requirement for the selecting circuits executing the multiplications is reduced owing to a smaller number of transistors required.

In a further embodiment of the multiplier the partial products generated in the multiplying arrays are successively added and the signs of the partial sums obtained are respectively propagated by two digits, thus making sure that for the adding of the partial products a smaller number of adders and thus, with an integrated structure, a reduced surface requirement is needed.

In a still further embodiment of the multiplier, the multiplying arrays are designed in such a manner that the presenting of the partial end products by means of a feedback of the carry are generated from the most significant digit of the partial end product. Thus, a further step in the generation of the partial end products is avoided and consequently the time delay caused by multiplication is reduced.

In another embodiment of the multiplier, buffers are associated to the multiplying arrays. It is thus possible to supply the multiplying arrays with the next operands while the logic unit still logically combines the preceeding operands.

Further developments and advantages of the invention are specified in the subsequent description of an embodiment of a multiplier according to the invention as depicted in the drawing. The drawing shows the following:

BRIEF DESCRIPTION OF THE FIGURES

FIG. 3B—a table giving the output signal of the selecting circuit as a function of the factors formed in accordance with FIG. 2A;

FIG. 6B—a schematic logic circuit diagram of parts of the carry adding array, and FIGS. 6C and 6D—schematic logic circuit diagrams of embodiments of the carry modifying unit depicted in FIG. 6A.

DETAILED DESCRIPTION OF THE PREFERRED EMBODIMENTS

Figure 1:
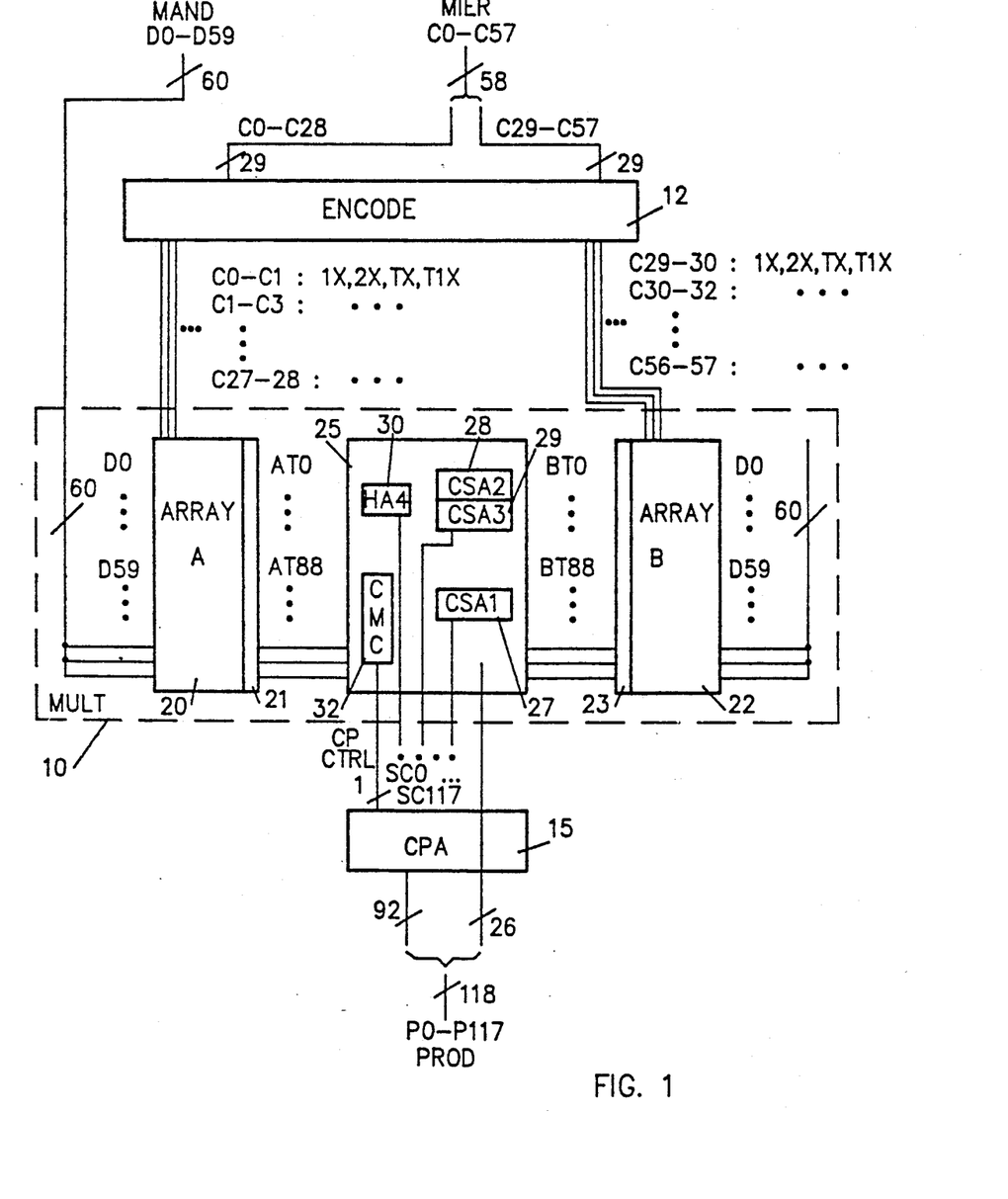
FIG. 1—a schematic block diagram of the multiplier structure.

The multiplier depicted in FIG. 1 as a schematic block diagram is composed of a multiplying unit MULT 10, an encoding unit ENCODE 12, and a carry adder array CPA 15. Multiplying unit 10 is supplied with a multiplicand MAND as a first operand consisting of binary FIGS. D0 to D59. Encoding unit 12 is applied by a multiplier MIER, the second operand consisting of binary FIGS. C0 to C57 in such a manner that the FIGS. C0 to C28 and C29 to C57 of the multiplier are respectively combined. The FIGS. marked with the index "0" are the most significant bits.

As will be explained below, encoding unit 12 generates from FIGS. C0 to C28 and C29 to C57 of the multiplier specific output signals in accordance with the Booth algorithm. The output signals are marked in FIG. 1 with the reference numbers 1X, 2X, TX, T1X, one set of these output signals being respectively associated to FIGS. C0 to C1, C1 to C3, etc., and C29 to C30, C30 to C32, etc. These output signals derived from FIGS. C0 to C28 and C29 to C57 of the multiplier are applied to multiplying unit 10.

Multiplying unit 10 is composed of two multiplying arrays ARRAY A 20 and ARRAY B 22, two buffers 21, 23 associated to multiplying arrays 20, 22, and a logic unit 25. The output signals of encoding unit 12 which belong to FIGS. C0 to C28 of the multiplier are applied to multiplying array 20, whereas the output signals of encoding unit 12 which belong to FIGS. C29 to C57 of the multiplier are applied to multiplying array 22. As will be described below, FIGS. C0 to C28 and C29 to C57 of the multiplier are multiplied with FIGS. D0 to D59 of the multiplicand in the two multiplying arrays 20, 22. As results of these multiplications a partial end product consisting of FIGS. AT0 to AT88 is available at the output of multiplying array 20, and a partial end product consisting of the FIGS. BT0 to BT88 is available at the output of multiplying array 22.

These two partial end products AT0 to AT88, BT0 to BT88 are stored in buffers 21, 23.

Partial end products AT0 to AT88 and BT0 to BT88 are applied to logic unit 25 which comprises a first, a second, a third, and a forth adding array CSA1 27, CSA2 28, CSA3 29 and HA4 30. These four adding arrays 27, 28, 29, 30 generate from the input signals supplied to logic unit 25 a number of output signals identified in FIG. 1 with the reference number SC0 to SC117.

Furthermore logic unit 25 comprises a carry modifying unit CMC 32 by means of which an output signal CPCTRL is produced.

Output signals SC0 to SC117 and CPCTRL of logic unit 25 are applied to carry adding array 15 which from the above listed signals generates an output signal PROD consisting of binary FIGS. P0 to P117 which corresponds to the product of multiplicand and multiplier.

By means of the table in FIG. 2A and the arithmetic example given in FIG. 2B, the Booth algorithm used will be explained in the following. In this algorithm, figure pairs are formed as follows:

C56 to C57, C54 to C55, etc., and
C27 to C28, C25 to C26 etc.

Generally expressed, these figure pairs are as follows:
$C_{i-1}$ to $C_i$, with
i=57, 55, 53, etc.

i=28, 26, 24, etc.

Added to these figure pairs is the respective subsequent FIG. $C_{i+1}$. From these three FIGS. $C_{i-1}$, $C_i$, $C_{i+1}$ specific factors are obtained as a function of the respective binary values, in accordance with the table of FIG. 2A.

Figure 2A:
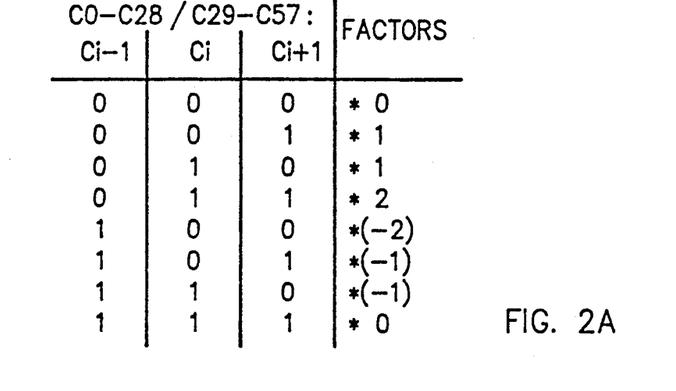
FIG. 2A—a table giving the connection between the figures of the second operand and the factor applied to the multiplying arrays.
Figure 2B:
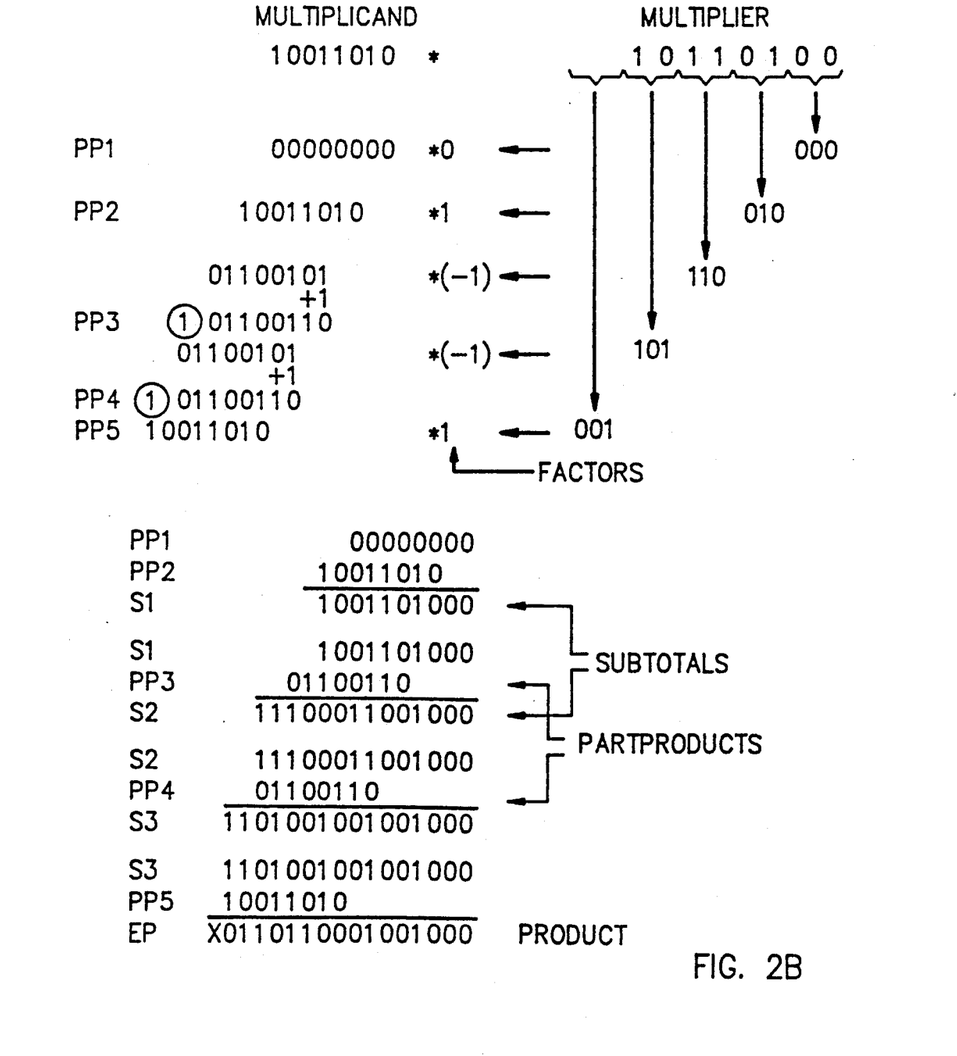
FIG. 2B—an example for a multiplication of two operands, with the factor generation of FIG. 2A being used.

With these factors the multiplicand is multiplied, as represented in an example in FIG. 2B. There, the multiplier is divided in figure pairs, with an additional figure being associated to each figure pair. In accordance with the table of FIG. 2A there results one respective factor with which the multiplicand is to be multiplied, making sure that the partial result obtained is to be shifted by the respective number of figures by which the associated figure pair in the multiplier has been shifted, too. In FIG. 2B, the partial products associated to the respective factors are marked with the refence number PP1 to PP5. The "1" surrounded by a circle in the partial products PP3 and PP4 indicates that these partial products have a negative sign.

Partial products PP1 to PP5 are successively added, forming partial sums S1 to S3. A negative sign of a partial product is considered in that the sum or the carry of the most significant digit of the partial sum is propagated by another two digits. If in the addition of partial sum S3 and of partial product PP5 into end product EP there is a carry this is ignored as the consequence of the Booth algorithm being used; this is indicated in FIG. 2B by the reference "x". Final product EP without the digit marked "x" will then represent the product of the multiplicand with the multiplier.

The encoding of FIGS. C0 to C28 and C29 to C57 of the multiplier in factors according to the table of FIG. 2A is implemented in encoding unit 12. The factors are represented in the form of the above mentioned output signals 1X, 2X, TX, T1X, with one set of output signals being associated to each group of FIGS. belonging to an i, in accordance with the above given specifications.

The multiplication of the factors generated by the encoding unit with the multiplicand are implemented in multiplying arrays 20, 22. Multiplying array 20 is supplied with the factors associated to FIGS. C0 to C28 of the multiplier, and multiplying array 22 with the factors associated to FIGS. C29 to C57 of the multiplier. The multiplications are effected by means of selecting circuits MUX35 contained in multiplying arrays 20, 22, one being depicted in FIG. 3A.

Figure 3A:
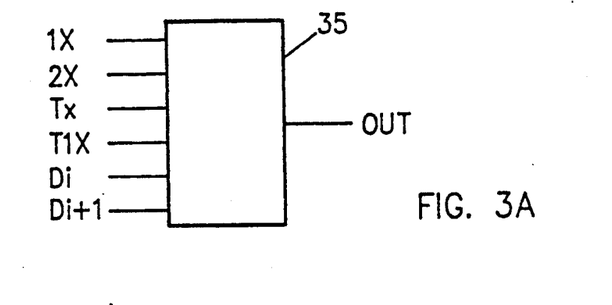
FIG. 3A—a schematic block diagram of a selecting circuit.

Selecting circuit 35 represented in FIG. 3A as a schematic block is supplied with output signals 1X, 2X, TX, T1X of encoding unit 12, as well as with two successive FIGS. $D_i$ and $D_{i+1}$ of the multiplicand, these output signals and the given figures of the multiplicand being respectively associated to a multiplier figure group belonging to an i. From these input signals selecting circuit 35 generates an output signal OUT in the manner given in the table of FIG. 3B.

Figure 3B:
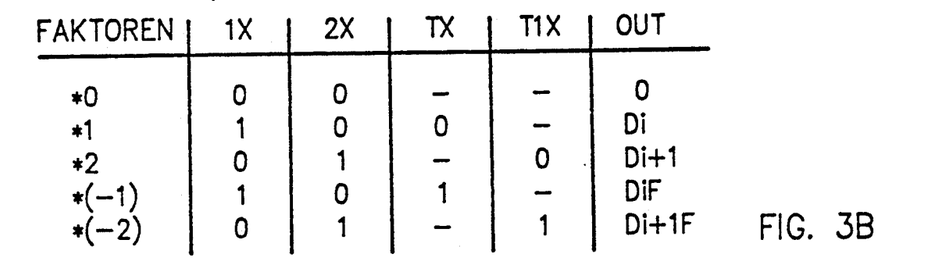

If output signals 1X and 2X both equal 0, the multiplicand is to be multiplied with the factor "0". If the output signal 1X equals 1, the multiplicand is to be multiplied with the factor "1" or with the factor "−1". If, however, the output signal 2X equals 1, the multiplicand is to be multiplied with the factor "2" or with the factor "−2". Output signals TX and T1X decide whether the above mentioned factors are positive or negative. If TX equals 1, the factor "−1" is selected; if factor T1X equals 1, the same applies to the factor "−2".

As will be explained below, each digit of the multiplicand has an associated selecting circuit 35. If this selecting circuit is supplied with input signals which represent the factor "1", selecting circuit 35 switches digit Di of the multiplicand to the output. This corresponds to a multiplication of this digit of the multiplicand with 1. If, on the other hand, the input signals of selecting circuit 35 represent the factor "2" the FIG. Di+1 of the multiplicand is passed on as an output signal. The FIG. Di+1 has a value that is lower by one digit than the FIG. Di of the multiplicand. The switching of the FIG. Di+1 to the output of selecting circuit 35 thus represents a shifting of the multiplicand by one digit toward a higher value, which in turn corresponds to a multiplication of the multiplicand with 2. If the input signals of selecting circuit 35 represent the factors "−1" or "−2", the corresponding negated FIGS. DiF and Di+1F of the multiplicand are generated as output signals at the output.

Figure 3C:
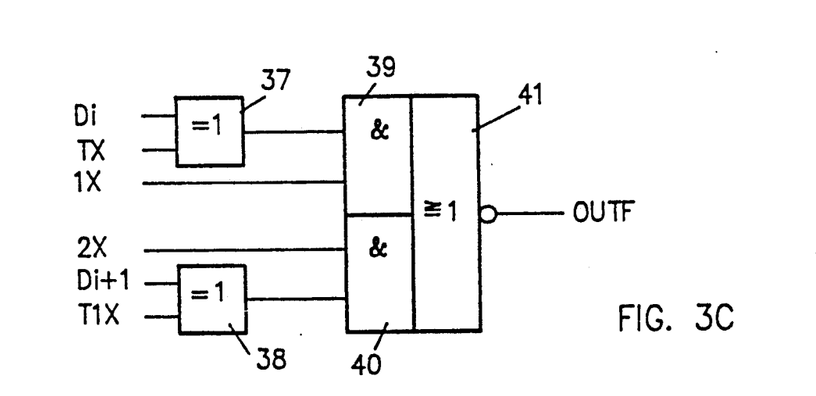
FIGS. 3C and 3D as well as FIGS. 3E and 3F—two schematic logic circuit diagrams as well as their circuit realization of the respective selecting circuit.
Figure 3D:
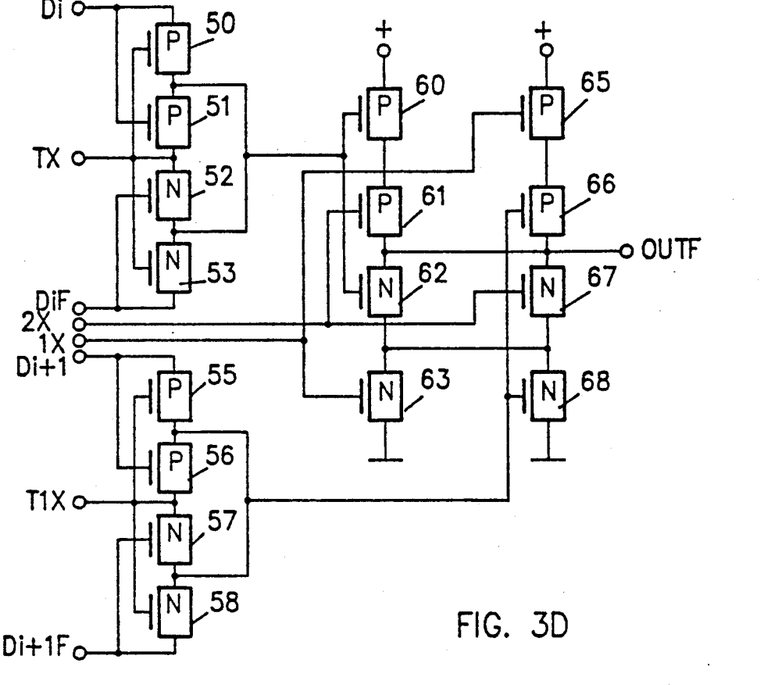

FIGS. 3C and 3D as well as 3E and 3F give two embodiments for realizations of selecting circuit 35.

In the embodiment according to FIG. 3C, signals Di and TX as well as signals Di+1 and T1X are respectively applied to an XOR gate 37, 38 whose output signals are respectively applied to an AND gate 39, 40. AND gate 39 is furthermore supplied with signal 1X and AND gate 40 with signal 2X. The outputs of AND gates 39, 40 are connected to a negated OR gate 41 at whose output the negated signal OUTF is available. Selecting circuit 35 of FIG. 3C can be realized in the form of a circuit in accordance with FIG. 3D in CMOS technology. There, transistors 50, 51, 52, 53 as well as transistors 55, 56, 57, 58 form a series-arranged circuit. Transistors 50, 51, 55, 56 are P-transistors, transistors 52, 53, 57, 58 are N-transistors.

FIG. Di of the multiplicand is supplied to transistor 50 and to the gate of transistor 51; negated FIG. DiF to the gate of transistor 52 and to transistor 53. Accordingly, FIG. Di+1 as well as negated FIG. Di+1F is connected to transistors 55, 56 as well as to transistors 57, 58. Signal TX is applied to the gates of the two transistors 50, 53 which are connected to the point of connection of transistors 51, 52. Correspondingly, signal T1X is applied to transistors 55, 58 as well as transistors 56, 57. Further transistors 60, 61, 62, 63 as well as transistors 65, 66, 67, 68 respectively form a series-arranged circuit from a positive supply voltage to ground. Transistors 60, 61, 65, 66 are P-type transistors, transistors 62, 63, 67, 68 are N-type transistors. The gates of transistors 60, 62 are connected to the point of connection of transistors 50, 51 as well as of transistors 52, 53. Correspondingly, the gates of transistors 66, 68 are connected to the points of connection of transistors 55, 56 as well as of transistors 57, 58. The gates of transistors 61, 67 are supplied with the signal 2X, and the gates of transistors 63, 65 with signal 1X. The point of connection of transistors 62, 63 and of transistors 67, 68 are interconnected. Similarly, the points of connection of transistors 61, 62 and of transistors 66, 67 are interconnected, with output signal OUTF being available at that point.

Figure 3E:
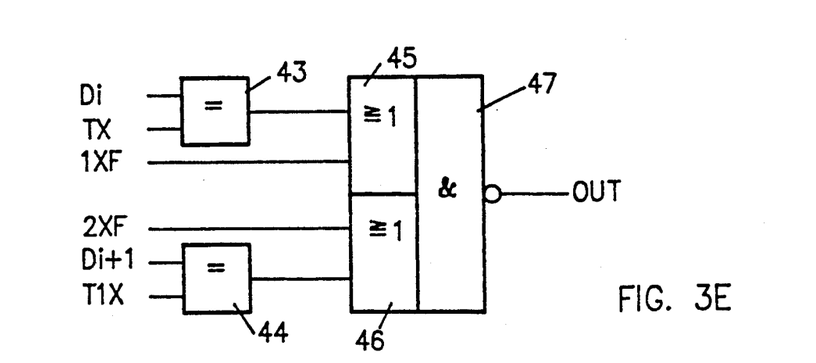

In the embodiment of selecting circuit 35 as shown in FIG. 3E signals Di and TX as well as signals Di+1 and T1X are respectively applied to an XNOR gate 43, 44 whose output signals are respectively applied to an OR gate 45, 46. Furthermore, the negated signals 1XF and 2XF are applied to OR gates 45, 46. The outputs of both OR gates 45, 46 are connected to a negated AND gate 47 at whose output signal OUT is available.

Figure 3F:
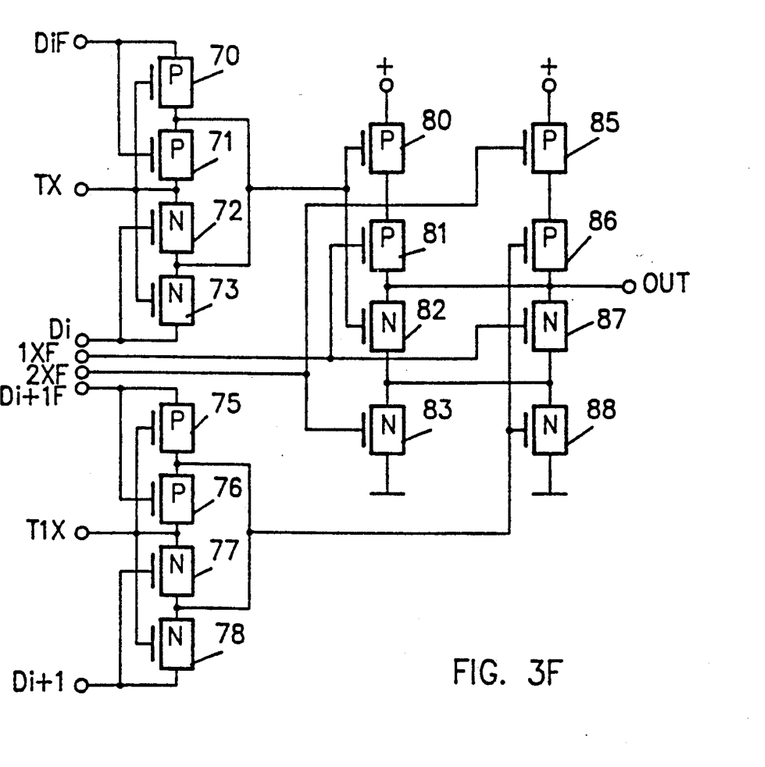

This selecting circuit 35 of FIG. 3E can be realized by the circuit depicted in FIG. 3F. This circuit comprises transistors 70 to 73, 75 to 78, 80 to 83 and 85 to 88. The interconnection of these transistors corresponds to that of the circuit of FIG. 3D. Signals TX and T1X are also applied to the circuit of FIG. 3F as in the circuit of FIG. 3D.

In the circuit of FIG. 3F, the signals Di, DiF, Di+1, Di+1F are always negated compared with the circuit of FIG. 3D. Instead of signals 2X and 1X in the circuit of FIG. 3D, the negated signals 1XF and 2XF are applied in the circuit of FIG. 1 in the same position. As an output signal, signal OUT is available in the circuit according to FIG. 3F.

Figure 4:
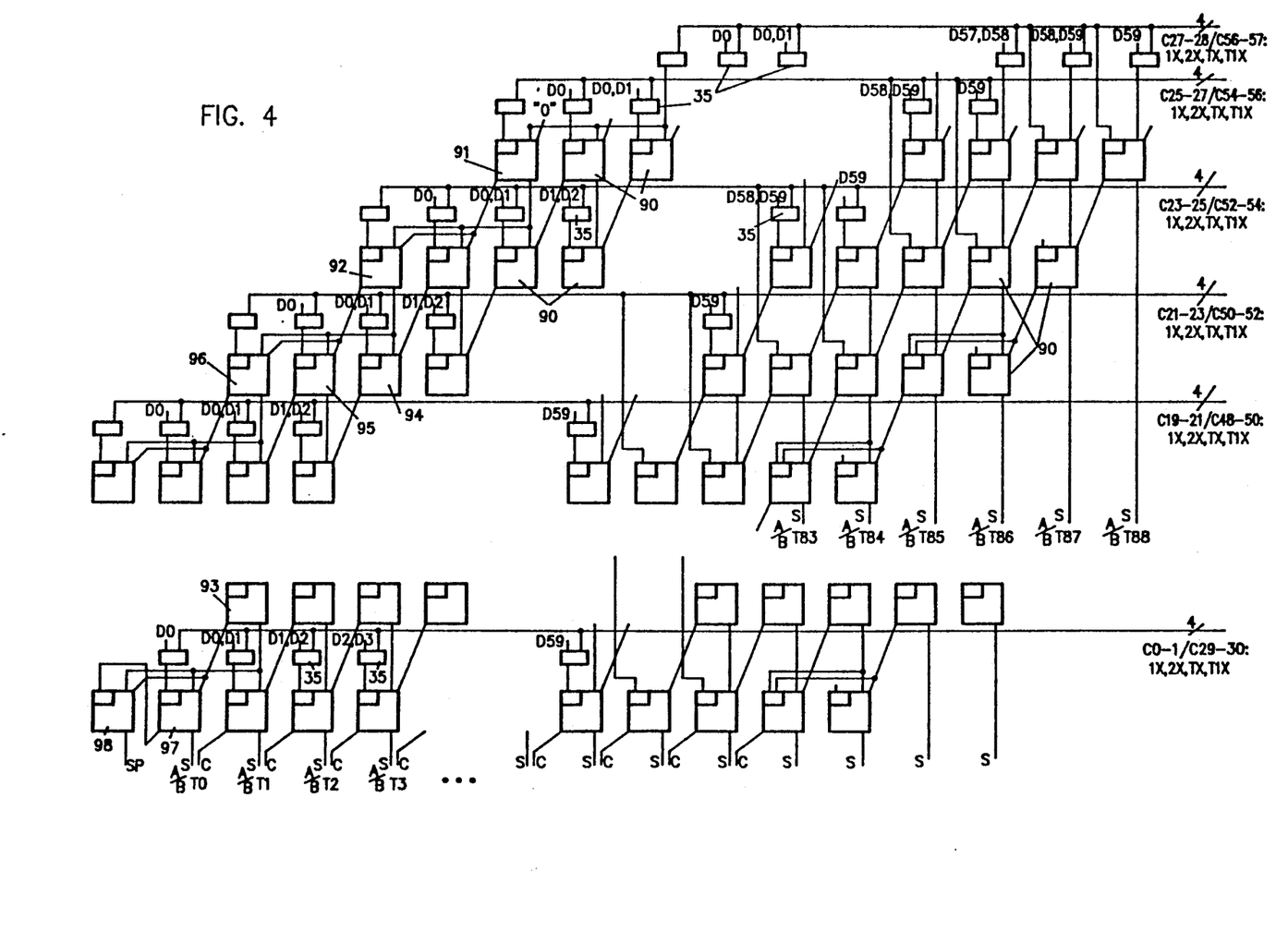
FIG. 4—a schematic block diagram of one of the two multiplying arrays

In FIG. 4, one of the multiplying arrays 20, 22 is generally depicted as a schematic block diagram. Each of these multiplying arrays 20, 22 is composed of a multitude of adders 90 arranged in rows and columns. A number of adders 90 is shown in FIG. 4 with specific reference numbers 91 to 98.

Each column of the multiplying array of FIG. 4 is associated to a binary digit, with the most significant digit being arranged at the left in FIG. 4. In each row of the given multiplying array FIGS. D0 to D59 of the multiplicand are multiplied with the factors belonging to FIGS. C0 to C57 of the multiplier, and respectively added to the preceding partial product. For that purpose, one respective selecting circuit 35 is arranged in series to an input of adders 90, the multiplication in the respective position being implemented therewith, whereas the other input of adders 90 is respectively applied with the corresponding digit of the preceding partial product.

The rows succeeding each other from top to bottom in FIG. 4 are shifted with respect to their adders 90 in accordance with the correlation of rows to the FIGS. of the multiplier by two respective digits toward higher values. The propagation mentioned in connection with the arithmetic example of FIG. 2, by two digits in the event of a negative partial product is achieved for the multiplier array of FIG. 4 in that e.g. the output signals of adder 92, i.e. sum and carry are applied to the corresponding inputs of adders 94, 95 and 96.

In the multiplier array of FIG. 4, the result obtained from the addition of the partial products is available at the outputs of those adders 90 which are arranged in the individual columns in the last bottom line. The end product consists in each column, i.e. in each digit, of one sum figure S and one carry figure C obtained from the next lower significance digit. As mentioned above, multiplying array 20 creates the partial end product AT0 to AT88, and multiplying array 22 the partial end product BT0 to BT88.

As another output signal the multiplier array depicted in FIG. 4, i.e. by adder 98, generates a signal SP. This signal SP is only a logical "1" if there is either a carry from adder 97, or if one of the output signals of adder 93 is a logical "1". These two output signals can never be a logical "1" simultaneously, since adder 91 is supplied with a logical "0" as an input signal. Consequently, the result of the addition in adder 91 can never exceed the value 2. Due to the propagation of the output signals of adder 91 by two digits one of the input signals of adder 92 is in any event a logical "0", so that the addition in adder 92 can never exceed the value 2, either. This function is continued over the successive lines down to adder 93. As specified above, one of the two output signals of adder 93 is in any case a logical "0". Output signal SP of adder 98 thus represents an ORing of the sign of the last but one line comprising adder 93 with the carry from the last line comprising adder 97.

The derivation of the two partial end products AT0 to AT88 and BT0 to BT88 from the multiplicand and the factors of the multiplier are computed in the two multiplying arrays 20, 22 in a time-parallel mode, i.e. roughly simultaneously. Partial end products AT0 to AT88 and BT0 to BT88 are thus available almost simultaneously at the outputs of multiplying arrays 20, 22 for buffering in buffers 21, 23 and for further processing.

Figure 5A:
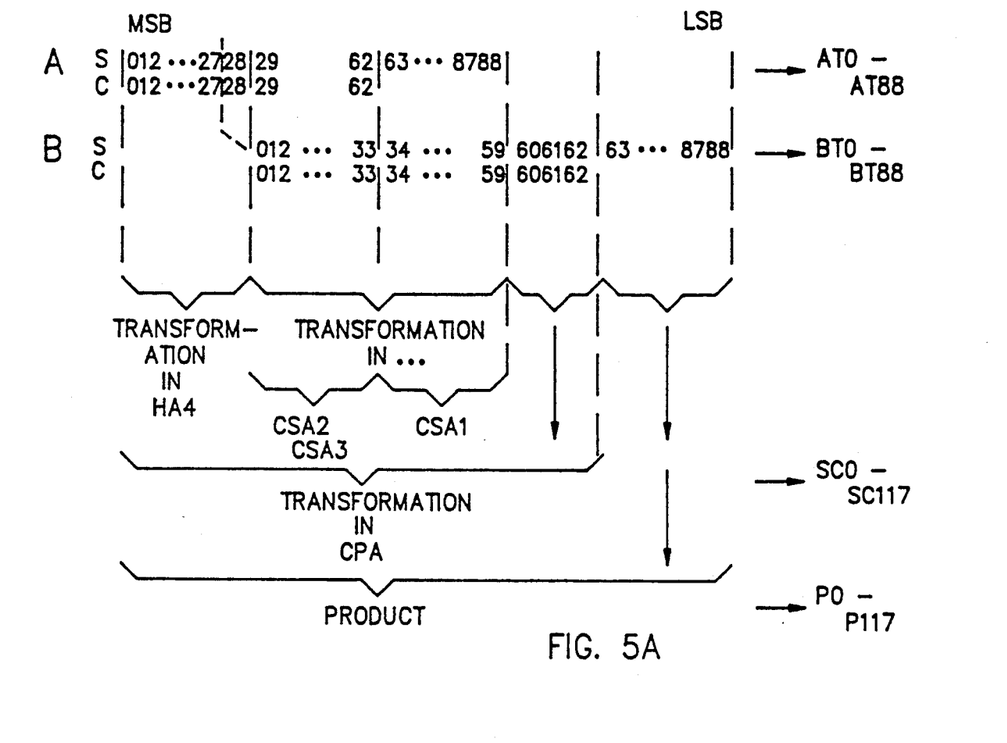
FIGS. 5A and 5B—the logical combination of the two partial end products formed by the multiplying arrays in a survey diagram and a block diagram.
Figure 5B:
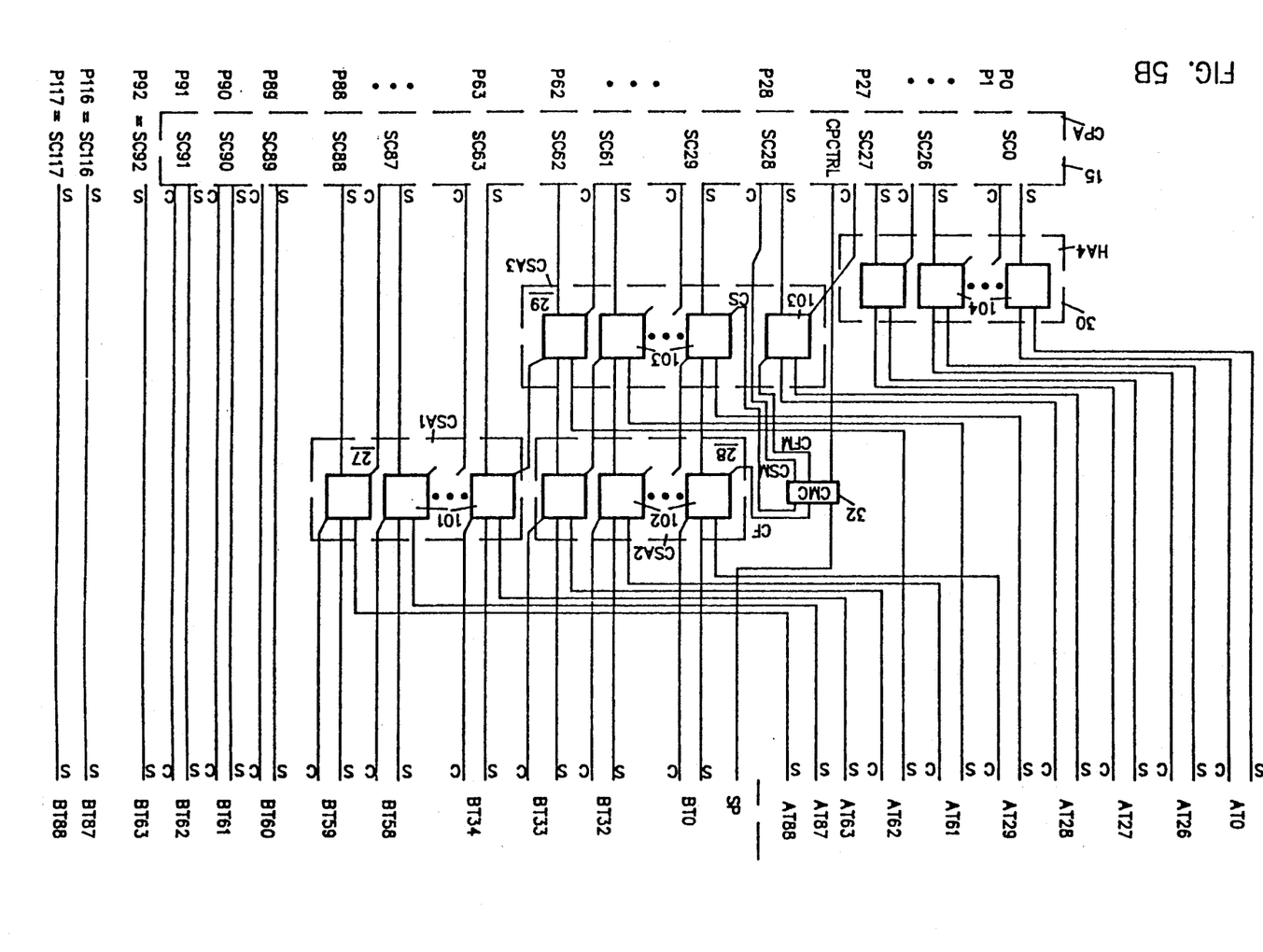

FIGS. 5A and 5B show schematically the logical combination of the two partial end products AT0 to AT88 and BT0 to BT88 into final product P0 to P117. The two partial end products are respectively composed of sum FIGS. 0 to 88 and carry FIGS. 0 to 62.

Sum FIGS. 63 to 88 of partial end product BT0 to BT88 are the direct representation of FIGS. P92 to P117 of end product P0 to P117.

Sum and carry FIGS. 60 to 62 of partial end product BT0 to BT88 are applied to carry adding array 15 and are transformed there into FIGS. P89 to P91 of end product P0 to P117. Carry adding field 15 comprises a plurality of adders by means of which the carries from individual digits are respectively added to the next more significant digit.

Sum FIGS. 63 to 88 of partial end product AT0 to AT88, as well as sum and carry FIGS. 34 to 59 of partial end product BT0 to BT88 are applied to the first adding array CSA1, 27 containing a multitude of adders 101. Supplied to each adder 101 are sum FIGS. corresponding to each other according to their digits, of the partial end products AT0 to AT88 and BT0 to BT88, and the carry figure of the next-lower significant digit of the partial end product. Adders 101 of the first adding array 27 form thereof a first intermediate result SC63 to SC88 which in each digit consists of a sum and of a carry. This first intermediate result is processed further in carry adding array 15 into FIGS. P63 to P88 of end product P0 to P117.

The sum and carry FIGS. 28 to 62 of partial end product AT0 to AT88, as well as sum and carry FIGS. 0 to 33 of partial end product BT0 to BT88 are applied to the second and third adding arrays CSA2, 28 and CSA3, 29. Adding arrays 28, 29 comprise a plurality of adders 102, 103 associated to the individual digits. In adders 102 of adding array 28 sum figures corresponding to each other according to their digits, of the two partial end products AT0 to AT88 and BT0 to BT88, as well as the next lower significance carry figure of partial end product BT0 to BT8 are added to a second intermediate result consisting in each digit of sum and carry. In adders 103 of third adding array 29 the digit-corresponding sum of the second intermediate result, the next lower carry of the second partial result, and the next lower carry figure of partial end product AT0 to AT88 are added up, forming a third intermediate result SC28 to SC62 which in each digit consists of a sum and a carry, and which in the subsequent carry adding array 15 is transformed into FIGS. P28 to P62 of final product P0 to P117.

Sum and carry FIGS. 0 to 27 of partial end product AT0 to AT88 are applied to the fourth adding array HA4, 30. It comprises a multitude of half-adders 104. In each of half-adders 104 the next lower significance carry figure is added to the sum figure. Fourth adding array 30 forms a fourth intermediate result SC0 to SC27 which in each digit consists of a sum and a carry. This fourth intermediate result is transformed in carry adding array 15 into FIGS. P0 to P27 of end product P0 to P117.

As explained in connection with the arithmetic example of FIG. 2B, a carry marked "x" there has to be ignored in the most significant digit of end product EP. This is achieved in the circuit according to FIG. 5B by means of carry modifying unit CMC 32.

This carry modifying unit 32 is supplied with signal SP generated by multiplying array 22, the carry marked CF from the most significant adder 102 of second adding array 28, and the carry marked CS of digit-corresponding adder 103 of third adding array 29. These input signals are modified by carry modifying unit 32 into signals SPM=CPCTRL, CFM and CSM. Signal SPM is applied to carry adding array 15, signal CMF to most significant adder 103 of the third adding array 29, and signal CMS is applied as carry of the third adding array 29 to carry adding array 15.

Figure 6A:
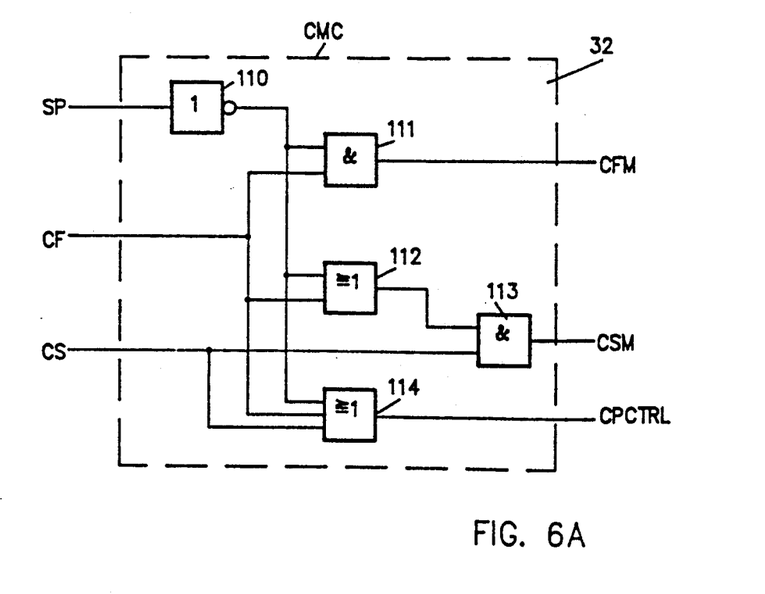
FIG. 6A—a schematic logic circuit diagram of the carry modifying unit.

The logical combination of the above given input and output signals of carry modifying unit 32 is shown in the schematic block diagram of FIG. 6A. There, an inverter 110 is supplied with signal SP. The output of inverter 110 is connected to one respective input of an AND gate 111, an OR gate 112 and another OR gate 114. Signal CF is respectively applied to another input of the last-mentioned components. Signal CS is applied to a third input of OR gate 14 and another AND gate 113. A further input of this AND gate 113 is connected to the output of OR gate 112. At the output of AND gate 111 signal CFM, at the output of AND gate 113 signal CSM, and at the output of OR gate 114 signal CPCTRL are available.

Carry modifying unit 32 thus performs the following functions:

CFM = SPF − CF,
CSM = (SPF + CF) − CS and
SPM = CPCTRL = SPF + CF + CS, where "−"=AND, "+"=OR.

If carry modifying unit 32 indicates that the carry marked "x" and explained with reference to the arithmetic example of FIG. 2B has to be ignored, this is achieved by signal CPCTRL. For that purpose, an AND gate 118 is provided in carry adding array 15, according to the circuit of FIG. 6B, which modifies bit position 29 as a function of input signal CPCTRL.

Figure 6B:
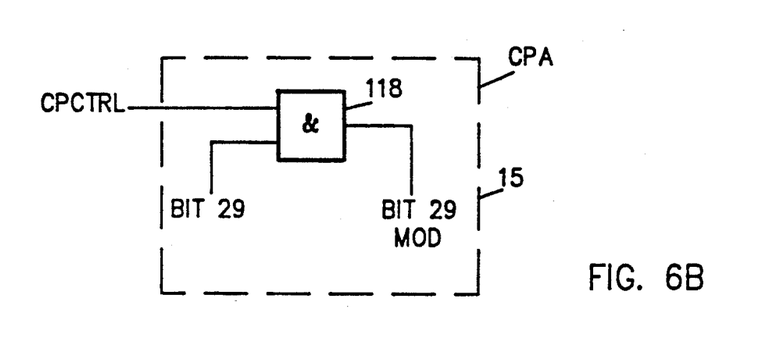
Figure 6C:
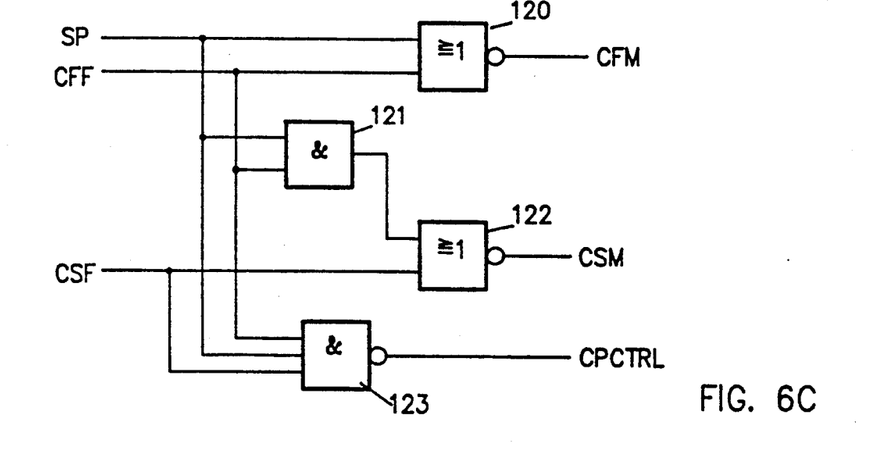
Figure 6D:
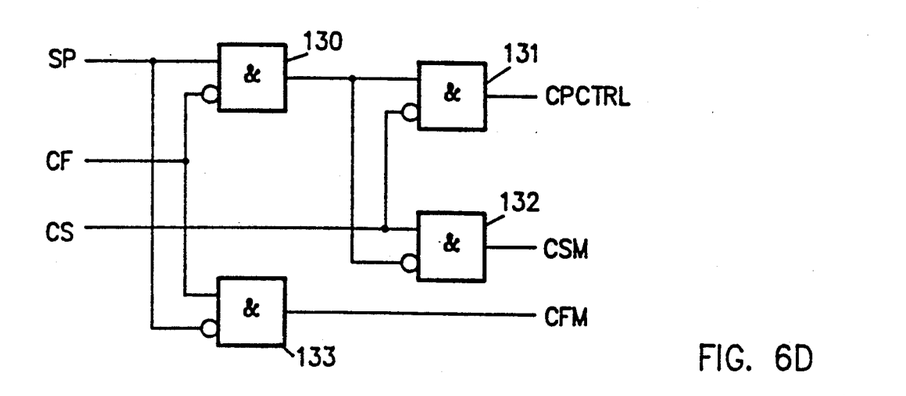

FIG. 6C and 6D show two embodiments of carry modifying unit 32 in the form of schematic block diagrams.

The circuit of FIG. 6C comprises two negating OR gates 120, 122, an AND gate 121 as well as another negating AND gate 123. Signal SP is applied to OR gate 120, AND gate 121 and AND gate 123. Negated signal CSS is supplied correspondingly. Negated signal CSF is applied to OR gate 122 and to AND gate 123. The further input of OR gate 122 is joined to the output of AND gate 121. At the output of OR gate 120 signal CFM, at the output of OR gate 122 signal CSM, and at the output of AND gate 123 signal CPCTRL are available.

The circuit of FIG. 6B comprises four AND gates 130, 131, 132, 133, one respective input being switched in an inverting mode. Signal SP is applied to the non-inverting input of AND gate 130 and to the inverting input of AND gate 133. Signal CF is supplied to the inverting input of AND gate 130 and to the non-inverting input of AND gate 133. The output of AND gate 130 is connected to the non-inverting input of AND gate 131 and to the inverting input of AND gate 132. Signal CS is connected to the inverting input of AND gate 131 and to the non-inverting input of AND gate 132. At the output of AND gate 131 signal CPCTRL, at the output of AND gate 132 signal CSM, and at the output of AND gate 133 signal CFM are available.

We claim:

1. A multiplier for multiplying a first digital operand with a second digital operand, comprising:
   encoding means, coupled to said second operand, for identifying factors corresponding to groups of bits of said second operand according to an algorithm, and
   multiplying means, coupled to said first operand and supplied with said factors created by said encoding means, for multiplying said first operand with said factors and adding partial end products resulting from the multiplications to yield an end product, said multiplying means comprising two multiplying arrays, each of said multiplying arrays being supplied with said first operand, and one of said multiplying arrays being supplied with the factors corresponding to the most significant bits of said second operand and the other one of said multiplying arrays being supplied with the factors corresponding to the least significant bits of the second operand, each of said multiplying arrays simultaneously multiplying said first operand with said corresponding factors and adding resultant partial products to yield a partial end product comprising sum bits and respective carry bits for at least some of said sum bits, each of said respective carry bits having corresponding significance to the respective sum bit and being derived from addition of next less significant bits, said multiplying means further comprising logic means, supplied with said partial end products for logically adding said sum bits and respective carry bits of said partial end products into said end product, said logic means including carry modifying means, supplied with a carry bit generated by one or more logical operations involving the most significant bit of the less significant partial end product and a sign generated by said other multiplying array, for influencing a next most significant bit of the end product based on said carry bit and said sign.

2. Multiplier as claimed in claim 1, wherein said logic means comprises a first adding array to which is applied some sum bits and respective carry bits of the less significant partial end product and sum bits of the more significant partial end product and a second adding array to which is applied other sum bits and respective carry bits of the less significant partial end product and other carry bits of the more significant partial end product, said first and second adding arrays forming first and second intermediate results, respectively, consisting of sum and carry bits.

3. Multiplier as claimed in claim 2, wherein the multiplying arrays include means for forming the signs of the partial end products by a feedback of the carry of the most significant bit of the partial end products.

4. Multiplier as claimed in claim 2, wherein lower significant carry bits of the less significant partial end product are applied to the first adding array and higher significant carry bits of the less significant partial end product are applied to the second adding array.

5. Multiplier as claimed in claim 4, further comprising a third adding array to which is applied each sum bit and respective carry bit of the second intermediate result, each of said respective carry bits having a corresponding significance as the respective sum bit and being derived from addition of next less significant bits forming the second intermediate result, and each sum bit of the more significant partial end product having the same significance as any of said sum bits and respective carry bits of the second intermediate result which are applied to said third adding array, said third adding array forming third intermediate results consisting of sum and carry bits.

6. Multiplier as claimed in claim 5, further comprising a fourth adding array to which is applied other sum bits and respective carry bits of the more significant partial end product, said fourth adding array forming fourth intermediate results respectively consisting of sum and carry bits.

7. Multiplier as claimed in claim 6, further comprising a carry adding array to which is applied the sum bits and respective carry bits of the first, third and fourth intermediate results, and sum bits and respective carry bits of lower significance bits of the less significant partial end product, said carry adding array forming part of the end product.

8. Multiplier as claimed in claim 7, wherein
said algorithm is a Booth algorithm; and
said carry bit generated by one or more logical operations involving the most significant bit of the less significant partial end product and supplied to said carry modifying means is a carry bit associated with the most significant bit of the less significant partial end product of the second and third adding arrays.

9. Multiplier as claimed in claim 8, wherein said carry modifying means performs the following functions:
CFM = SPF − CF,
CSM = (SPF + CF) − CF, and
SPM = SPF + CF + CS; where
SP = sign generated by said multiplying array which is supplied with the least significant bits of the second operand, SPF = negated sign,
CF = carry bit of a most significant adder of the second adding array,
CS = carry bit of a most significant adder of the third adding array,
SPM = modified sign SP,
CFM = modified carry CF,
CSM = modified carry CS, and
"−" = AND, and "+" = OR.

10. Multiplier as claimed in claim 1, wherein
said algorithm is a Booth algorithm, and
by applying the Booth algorithm the encoding means generates out of the bits of the second operand the following output signals representing the factors:

| bit pair i of the second operand | | | additional bit | factors belonging to bit pair i | output signals belonging to bit pair i | | | |
|---|---|---|---|---|---|---|---|---|
| $C_{i-1}$ | $C_i$ | $C_{i+1}$ | | | 1X | 2X | TX | T1X |
| 0 | 0 | 0 | | *0 | 0 | 0 | — | — |
| 0 | 0 | 1 | | *1 | 1 | 0 | 0 | — |
| 0 | 1 | 0 | | *1 | 1 | 0 | 0 | — |
| 0 | 1 | 1 | | *2 | 0 | 1 | — | 0 |
| 1 | 0 | 0 | | *(−2) | 0 | 1 | — | 1 |
| 1 | 0 | 1 | | *(−1) | 1 | 0 | 1 | — |

-continued

| bit pair i of the second operand | | additional bit | factors belonging to bit pair i | output signals belonging to bit pair i | | | |
|---|---|---|---|---|---|---|---|
| $C_{i-1}$ | $C_i$ | $C_{i+1}$ | | 1X | 2X | TX | T1X |
| 1 | 1 | 0 | *(−1) | 1 | 0 | 1 | — |
| 1 | 1 | 1 | *0 | 0 | 0 | — | — |

11. Multiplier as claimed in claim 10, wherein the multiplying means selects from output signals of the encoding means the bits of the first operand as follows:

| output signals belonging to bit pair i of the second operand | | | | factors belonging to bit pair i | selected bits of the first operand which belong to bit pair i of the second operand |
|---|---|---|---|---|---|
| 1X | 2X | TX | T1X | | |
| 0 | 0 | — | — | *0 | 0 |
| 1 | 0 | 0 | — | *1 | $D_i$ |
| 0 | 1 | — | 0 | *2 | $D_i + 1$ |
| 1 | 0 | 1 | — | *(−1) | $D_iF$ |
| 0 | 1 | — | 1 | *(−2) | $D_i + 1F$ |

12. Multiplier as claimed in claim 1 wherein said algorithm is a Booth algorithm, and the multiplying arrays include means for successfully adding the partial end products and propagating the respective sign of the partial sums obtained.

13. Multiplier as claimed in claim 1 wherein the multiplying arrays include associated buffer means for buffering the two partial end products.

14. Multiplier as claimed in claim 1 wherein said logic means comprises a plurality of adding arrays for adding said sum bits and respective carry bits of the less significant partial end products, said respective carry bits having the same significance as the respective sum bits, and sum bits and respective carry bits of the more significant partial end products, said respective carry bits having the same significance as the respective sum bits, and wherein each of said adding arrays consists of adding elements, substantially all of which adding elements within one adding array being supplied with and adding the same number of said bits.

15. Multiplier as claimed in claim 14 wherein said adding array comprises:
   a first adding array which is supplied with and adds the most significant sum bits and respective carry bits of the more significant partial end product;
   a second adding array which is supplied with and adds the least significant sum bits of the more significant partial end product, and sum bits and respective carry bits of the less significant partial end product which have corresponding significance as said least significant sum bits of the more significant partial end product; and
   a third adding array which is supplied with sum bits and respective carry bits of the less significant partial end product of lower significance than those applied to said second adding array.

16. Multiplier as claimed in claim 15 wherein:
   said first adding array is not supplied with any sum or respective carry bits of the less significant partial end product; and
   said third adding array is not supplied with any sum or respective carry bits of the more significant partial end product.

17. Multiplier as claimed in claim 16 wherein said second adding array is not supplied with any carry bits of the more significant partial end product.

* * * * *